April 30, 1935.  O. J. LEINS  1,999,732
THERMOSTAT CONTROL DEVICE
Original Filed Aug. 3, 1932
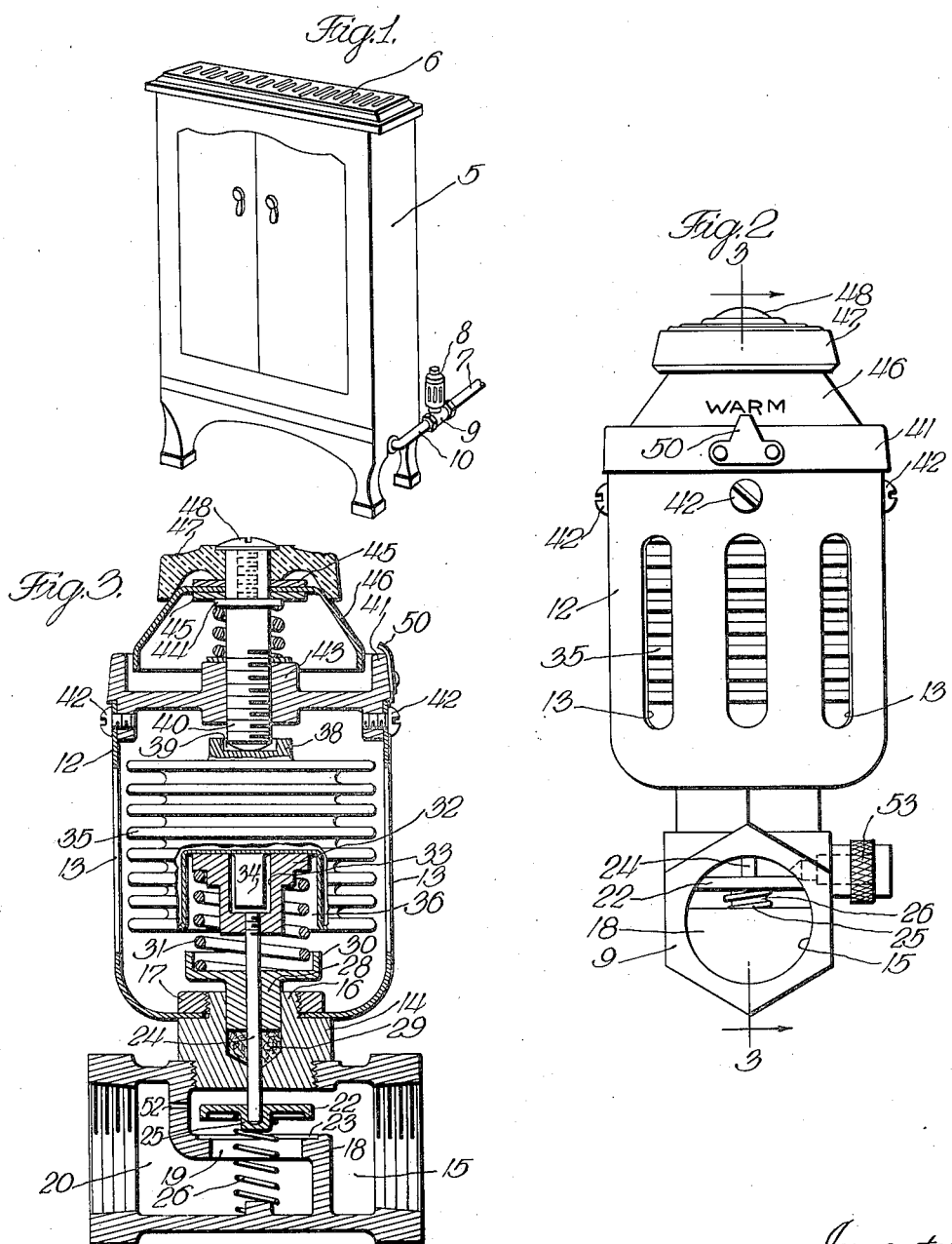

Patented Apr. 30, 1935

1,999,732

UNITED STATES PATENT OFFICE 1,999,732

THERMOSTAT CONTROL DEVICE

Oscar J. Leins, Milwaukee, Wis., assignor to Milwaukee Gas Specialty Company, Milwaukee, Wis., a corporation of Wisconsin Original application August 3, 1932, Serial No. 627,346. Divided and this application March 24, 1933, Serial No. 662,447.

8 Claims. (Cl. 236—99)

This invention relates to thermostat control devices, and more particularly to control devices for controlling the flow of fuel to space heaters and the like.

The present invention is a division of my co-pending application, Serial No. 627,346, filed August 3, 1932.

In the use of space heaters and other similar appliances using fluid fuel for heat energy, the flow of fuel to the burner of the appliances controlled is by a fuel supply valve, which is opened or closed in accordance with temperature variations within the enclosure being heated. The mechanism employed in the present invention for controlling the operation of the valve comprises an expansible bellows containing a volatile liquid responsive to thermal changes in the enclosure, the expansion and contraction of the bellows closing and opening the valve in accordance with increasing or decreasing temperatures within the enclosure.

In most heaters used for this purpose, the fuel flowing through the burner of the appliance is ignited by a pilot flame which receives its fuel supply from the same source as the burner. In the present invention, I contemplate the provision of means for maintaining a pilot flame within the space heater, to be used in conjunction with the thermostatically controlled valve. Such a pilot head for maintaining a pilot flame, which may be used in conjunction with the present invention, is disclosed in the copending application of Harold A. Mantz, Serial No. 560,412, filed August 31, 1931.

The thermostatically controlled valve of the present invention comprises, in its essential details, an expansible bellows supported between the valve and a selecting device. Upon rotation of the selecting device the bellows is moved either toward or away from the valve seat, thus changing the position of the valve with respect to the valve seat. The bellows is supported, at one end, by a spring-pressed collar member directly connected to the valve stem. At its other end, the bellows has abutting engagement with the end of the spindle of the selecting device. The bellows is thus floatingly supported between the valve stem and the spindle of the selecting device. Expansion of the bellows therefore urges the valve member toward the valve seat, while contraction of the bellows allows the valve member to be forced away from the seat. The selecting device determines the operating range of the bellows.

In order to acquaint those skilled in the art with the particular construction and operation of a preferred embodiment of my invention, I will now describe the same in detail in connection with the accompanying drawing, which discloses a preferred form of the invention.

In the drawing:

Figure 1 is a perspective view of a space heater provided with the thermostat control device of the present invention;

Figure 2 is an end elevational view of the thermostat control device shown in Figure 1; and Figure 3 is a sectional view of the thermostat shown in Figure 2, taken substantially on the line 3—3 thereof.

Referring now in detail to the drawing, in Figure 1 I have indicated a common type of space heater 5, having the grill portion 6 through which the heated air is passed into the enclosure, and having the fuel supply line 7 leading to the lower portion of the space heater. Disposed in the fuel supply line 7 is the thermally controlled device 8 of the present invention, which is mounted on top of a fuel supply valve indicated at 9 controlling the flow of fuel to the burner within the space heater 5, the valve 9 being connected at its outlet side to the feed pipe 10 leading to the heater of the burner.

Considering now in detail the thermal control device 8 in conjunction with the fuel supply valve 9, in Figures 2 and 3 I have disclosed this device in detail. Referring to these figures, the thermostat control device 8 comprises a casing section 12 which is provided with a plurality of openings 13 for allowing passage of air through the interior of the casing. This casing section 12 is secured at its lower end to a bushing 14, which threads into a suitable opening formed in the inlet chamber 15 of the fuel supply valve 9. The bushing 14 is provided with a portion of reduced diameter indicated at 16, which receives a nut 17 for securely holding the casing 12 in position with respect to the bushing 14.

The valve 9 is provided with a partition wall 18, which has an opening 19 formed therein for providing a passage between the inlet chamber 15 of the valve and the outlet chamber 20 thereof. Concentric with the opening 19 is the valve member 22, which has seating engagement with the valve seat 23 formed in the bushing 14. The valve member 22 is provided with a projecting boss portion 25 which serves as one support for a spring member 26 extending between the valve and a raised boss formed in the lower portion of the valve housing 9. The spring normally tends to urge the valve member 22 away from the seat 23.

The bushing 14 is provided with an axially enlarged recess adapted to receive a packing gland member 28, which bears against suitable packing 29 disposed in the lower portion of the recess, thus providing a gas-tight bearing support for the valve stem 24. The packing gland 28 is provided at its upper end with an outwardly flanged cup-shaped portion 30 which is adapted to form a seat for one end of a spring member 31, the other end of the spring member 31 bearing against a spring cap 32 disposed at the upper end of the valve stem 24, which is abuttingly engaged with the valve 22 by means of the spring 26. The spring cap 32 is recessed as at 33, to receive the projecting boss portion 34 of a sylphon or other type of expansible bellows indicated at 35.

The bellows 35 is preferably formed of light weight sheet metal, or other similar material which is flexible, and preferably contains an expansible volatile liquid responsive to temperature changes. The bellows is recessed as shown at 36, to provide a seat for the spring cap 32, and the projecting portion 34 of the bellows serves as a centering means for holding the spring cap in position with respect to the bellows. The spring 31 normally tends to force the bellows upwardly with respect to the packing gland 28, and thus tends to open the valve.

At its upper end, the bellows is provided with a bearing seat 38, which is recessed as at 39, for receiving the control screw 40 of the adjusting or selecting mechanism. This adjusting mechanism comprises a bearing housing 41 which is secured to the upper end of the casing 12 by means of a plurality of cap screws 42 threaded therein, and is provided at its center with a threaded bearing portion 43 receiving the control screw 40.

The control screw 40 is provided, adjacent its upper end, with an outwardly flanged collar 44, which collar forms a bearing for a pair of friction washers 45 between which a frusto-conical dial member 46 is positioned. A control knob 47 is mounted upon the extending portion of the control screw 40, and is held in position by means of the screw 48 threaded therein. The screw 48 forces the knob 47 against the washers 45, which bear against the collar 44 of the control screw 40, and thus serve to hold the dial member 46 in frictional engagement with respect to the control screw 40, in order that the screw will rotate upon rotation of the dial. The dial is preferably provided with suitable markings upon its sloping surface, such as shown in Figure 2, and the knob 47 is rotated in order to bring the desired markings to position with respect to a pointer member 50 carried upon the housing 41.

As the knob is rotated in a clockwise direction, the inner end of the control screw, which is in abutting engagement with the bearing projection 38 of the bellows 35, forces the bellows downwardly against the spring cap 32, and tends to close the valve against the pressure of the spring member 31. When the selecting means is rotated to cause the screw 40 to rotate away from the recess 39 in the bearing projection 38 of the bellows, the spring 31 forces the bellows upwardly to open the valve.

It is apparent, therefore, that after the knob 47 has been rotated to bring the desired temperature indication in position with respect to the pointer 50, the bellows will be in a position which opens the valve member 22 to a position corresponding to that desired by the dial setting. If the temperature increases above this desired value, the liquid contained within the bellows 35 will expand and force the bellows downwardly against the pressure of the spring member 31, tending to force the valve member 22 toward its seat 23, and thus restricting the flow of gas through the valve 9. If the temperature tends to decrease, the liquid within the bellows 35 will contract, and the spring 31 will force the spring cap member 32 upwardly, drawing the valve member 22 further away from the valve seat 23 in order to allow more fuel to flow to the heater.

Inasmuch as the air used for the purpose of supporting combustion within the heater 5 is drawn from the vicinity of the lower portion of the heater, the disposition of the thermostat control device in proximity to the lower portion of the heater will serve to sense the temperature of the air within the room, and this air will have surface contact with the bellows 35, due to the openings 13 provided in the casing 12. The variations in temperature of this air being drawn into the heater 5 will serve to vary the volume of the liquid within the bellows 35, and thus serve to maintain the valve 22 in proper position to allow the desired amount of fuel to flow through the valve 9 to the burner to maintain the desired predetermined temperature.

Since some of the burners used in connection with space heaters for enclosures and the like are not provided with pilot igniters, which serve to reignite the burners if the burner flame is accidentally extinguished, it is the practice to provide a flow of gas through the valve 9 which will serve to maintain a flame at the burner regardless of the position of the valve member 22. The inlet chamber 15 of the valve 9 is provided with a by-pass opening 52, which communicates with the outlet chamber 20 for passing a certain predetermined quantity of fuel to the valve regardless of the position of the valve member 22 with respect to its seat 23. This quantity is determined by means of a metering screw threaded into the by-pass, the screw being indicated at 53 in Figure 2. This quantity of fuel will serve to maintain a flame at the burner regardless of whether the fuel supply valve is opened or closed, and will thus supplant the use of a pilot flame.

However, the control device disclosed is equally well adapted for use in connection with burners having means for maintaining pilot flames adjacent thereto, and I do not intend to limit the use of the thermostat control device described to only burners not having the pilot flame connection. Also, it is apparent that the invention is equally well adapted for use in controlling the flow of a heated fluid to a radiator or the like.

I therefore do not intend to be limited to the exact details shown and described in connection with the illustrated embodiment of my invention, nor to be limited to the exact description of the structure set forth, but only in so far as defined by the scope and spirit of the appended claims.

I claim:

1. A thermostat control device comprising a casing, an expandible bellows within said casing, a valve, a valve stem, a recessed cap for said stem having abutting engagement in one end of said bellows, said bellows having stud means extending into said recessed cap for preventing lateral movement therebetween, and selecting mechanism carried by said casing and engaging the opposite end of said bellows, said bellows having socket means at its engaged ends for piloting said bellows between said stem and said selecting mechanism.

2. A thermostat control device comprising a casing, a recessed bushing secured to one end of said casing, a valve stem extending through said bushing into said casing and terminating in a recessed cap member, selecting means carried by said casing, an expandible bellows freely movable with respect to said casing and having abutting alined engagement between said cap member and said selecting means, said bellows having a recessed end portion provided with a projecting centering stud engaging in said recessed cap member, and spring means biased between said cap member and said bushing.

3. A thermostat control device comprising a perforated casing, a recessed bushing secured to one end of said casing, selecting means supported at the other end of said casing, a valve stem extending through said bushing and terminating in a cap member, said bushing having a cup-shaped end portion, an expandible bellows disposed within said casing and freely movable with respect thereto, said bellows having a recessed portion for receiving said cap member, said selecting means having abutting engagement with the opposite end of said bellows, and spring means biased between said cap member and said bushing, said cup-shaped portion of said bushing preventing lateral displacement of said spring means.

4. A thermostat control device comprising a perforated casing, a recessed bushing mounted at one end of said casing, a valve stem extending through said bushing into said casing and terminating in a cap member having a central recessed portion, selecting means including a control screw supported at the opposite end of said casing, packing means disposed in said recessed bushing about said stem, a packing gland member carried by said bushing and encircling said stem, an expandible bellows enclosed within and out of contact with said casing and movable with respect thereto, said bellows having a recessed end receiving said cap member and a stud disposed in said end and entering the recessed portion of said cap member, and spring means biased between said cap member and said packing gland member, rotation of said selecting means moving said bellows with respect to said casing against the tension of said spring means.

5. In combination, a casing having openings providing for passage of air therethrough, a recessed bushing supporting one end of said casing, a housing secured to the other end of said casing, a selecting device rotatably supported by said housing, a control spindle for said selecting device extending through said housing to the interior of said casing, a valve stem extending through said bushing and terminating in a cap member having a central cylindrical recess, an expandible bellows disposed in said casing and having abutting engagement with said spindle and said cap member, and means on said bellows for axially aligning said bellows with said valve stem comprising a recessed end portion receiving said cap member and having a central projecting stud engaging in the recess in said cap member.

6. In combination, a valve housing having a valve seat therein, a valve for said seat, a bushing secured to said housing, a perforated cup-shaped casing supported on said bushing, a valve pin extending through said bushing and having abutting supporting engagement with said valve, spring means extending through said valve seat for maintaining said engagement, an expandible bellows supported at one end of said valve stem, a flanged cap member secured to and enclosing the open end of said casing, and selecting means supported on said cap member and having abutting supporting engagement with said bellows interiorly of said casing.

7. In combination, a valve having a projecting valve stem, a cup-shaped casing receiving the projecting end of said stem, an expandible bellows having abutting support at one end on said stem, a closure member for the open end of said casing having a cylindrical peripheral flange and a central threaded boss portion, selecting means including a control spindle extending through said boss portion and having abutting supporting engagement with the other end of said bellows, and a dial member of conical cup-shaped section secured to said spindle and having its outer peripheral edge disposed within and adjacent to said cylindrical flange.

8. In combination, a valve body having a valve seat therein, a perforated casing supported by said body, a valve for engaging said seat, a valve stem having abutting engagement with said valve and extending into said casing, spring means maintaining said engagement and urging said valve away from said seat, an expansible bellows within said casing having a recessed socket portion at each end thereof, a centrally recessed cap member on said valve stem engaging in the socket portion of one end of said bellows, centering means carried by said bellows and extending into said cap member, a selecting spindle engaging in the socket portion of the opposite end of said bellows, and spring means encircling said valve stem and biased between said valve body and said cap member for resiliently supporting said bellows in floating position within said casing.

OSCAR J. LEINS.